(12) United States Patent
Olson et al.

(10) Patent No.: US 11,313,660 B2
(45) Date of Patent: Apr. 26, 2022

(54) DIGITAL GRIP GAUGE WITH SHAPED TIP

(71) Applicant: Lockheed Martin Corporation, Bethesda, MD (US)

(72) Inventors: Jonathan Richard Olson, Fort Worth, TX (US); Tyler Martin Rup, Fort Worth, TX (US); Philip Michael Chovanec, Fort Worth, TX (US); Matthew Timothy McKee, Fort Worth, TX (US); Alondra Renee Guevara, Fort Worth, TX (US); Carl Bargainer, Fairview, OR (US); Glynn Bartlett, Boerne, TX (US); Thomas E. Lyons, Jr., Rio Medina, TX (US); J. Mark Major, San Antonio, TX (US); Ryan McBee, San Antonio, TX (US); Paul Wood, Helotes, TX (US); Stephen L. Wiedmann, San Antonio, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 34 days.

(21) Appl. No.: 16/834,364

(22) Filed: Mar. 30, 2020

(65) Prior Publication Data
US 2021/0302145 A1    Sep. 30, 2021

(51) Int. Cl.
G01B 5/04    (2006.01)
G01B 3/22    (2006.01)

(52) U.S. Cl.
CPC ............... *G01B 5/043* (2013.01); *G01B 3/22* (2013.01)

(58) Field of Classification Search
None
See application file for complete search history.

(56) References Cited

U.S. PATENT DOCUMENTS

| | | | |
|---|---|---|---|
| 2,894,331 A | 7/1959 | Stratman | |
| 4,033,043 A | 7/1977 | Cunningham | |
| 4,876,800 A | 10/1989 | Pekar et al. | |
| 5,095,638 A * | 3/1992 | David | G01B 7/06 33/504 |
| 5,168,638 A * | 12/1992 | Barton | B23Q 16/005 33/520 |
| 5,189,808 A | 3/1993 | Evans et al. | |
| 7,065,897 B2 | 6/2006 | Luner et al. | |
| 7,070,375 B2 | 7/2006 | Hoeckelman | |

(Continued)

*Primary Examiner* — Christopher W Fulton
(74) *Attorney, Agent, or Firm* — Baker Botts L.L.P.

(57) ABSTRACT

In an embodiment, an apparatus includes one or more probes, a tip, a pin, and a measurement device. The one or more probes may be configured for insertion through an aperture in a component. The tip may be slidably engaged with the one or more probes and include a first end configured to contact a first surface of the component. The first end of the tip may be conically shaped. The pin may be slidably engaged with the one or more probes and include a first end configured for insertion into the aperture in the component such that the one or more probes are configured to contact a second surface of the component. The pin may be configured to move between a first position and a second position. An axis of the pin may be substantially aligned with an axis of the tip. The measurement device may be coupled to the tip and configured to measure a value indicating a grip length.

19 Claims, 5 Drawing Sheets

(56) References Cited

U.S. PATENT DOCUMENTS

| | | | |
|---|---|---|---|
| 7,165,336 B2 * | 1/2007 | Kim ................... | A61B 5/1076 33/512 |
| 7,596,846 B2 | 10/2009 | Hoeckelman | |
| 7,913,414 B2 | 3/2011 | Bumgardner et al. | |
| 8,512,349 B2 * | 8/2013 | Mengato ................ | A61B 90/06 606/102 |
| 8,572,860 B2 * | 11/2013 | Fritzinger .............. | A61B 90/06 33/512 |
| 8,606,540 B2 | 12/2013 | Haisty et al. | |
| 9,157,735 B2 | 10/2015 | Haisty et al. | |
| 9,255,779 B2 * | 2/2016 | Laflen ................... | G01B 3/306 |
| 9,435,636 B1 * | 9/2016 | Bumgardner ............ | G01B 3/28 |
| 9,918,796 B2 * | 3/2018 | Kortenbach ........... | A61B 90/06 |
| 10,330,453 B2 | 6/2019 | Rup et al. | |
| 2008/0104855 A1 * | 5/2008 | Kim ........................ | G01B 3/28 33/836 |
| 2010/0154238 A1 * | 6/2010 | Harshbarger ............ | G01B 7/26 33/836 |
| 2010/0198227 A1 * | 8/2010 | Kim ................... | A61B 5/1076 606/102 |
| 2018/0085104 A1 * | 3/2018 | Schmieding ......... | A61B 17/025 |

* cited by examiner

DIGITAL GRIP GAUGE WITH SHAPED TIP

TECHNICAL FIELD

This disclosure relates in general to measurement tools, and more particularly to a digital grip gauge with a shaped tip.

BACKGROUND

The manufacture of aircraft and other vehicles often requires the assembly of numerous components using fasteners. The grip length of a fastener refers to the length from the head of a fastener down to where the fastener shank or body ends and the fastener threads start. It is important that the fasteners installed have the right grip length in order to ensure that the component tightens down properly. If a component does not tighten down properly, gaps or areas of force concentration may arise that can cause fracturing. This can be problematic, especially when the assembly of aircraft or other vehicles is required to meet tight tolerances. Existing approaches suffer from certain deficiencies. For example, existing approaches to measuring grip length are manual, of questionable accuracy, and uncomfortable for the operator when performed repeatedly.

SUMMARY OF THE DISCLOSURE

According to embodiments of the present disclosure, disadvantages and problems associated with previous techniques for measuring grip length may be reduced or eliminated.

According to one embodiment, an apparatus includes one or more probes, a tip, a pin, and a measurement device. The one or more probes may be configured for insertion through an aperture in a component. The tip may be slidably engaged with the one or more probes and include a first end configured to contact a first surface of the component. The first end of the tip may be conically shaped. The pin may be slidably engaged with the one or more probes and include a first end configured for insertion into the aperture in the component such that the one or more probes are configured to contact a second surface of the component. The pin may be configured to move between a first position and a second position. An axis of the pin may be substantially aligned with an axis of the tip. The measurement device may be coupled to the tip and configured to measure a value indicating a grip length.

According to one embodiment, a system includes a gauge and a receiving unit. The gauge may be configured to measure a value indicating a grip length. The gauge may include one or more probes, a tip, a pin, and a measurement device. The one or more probes may be configured for insertion through an aperture in a component. The tip may be slidably engaged with the one or more probes and may comprise a first end configured to contact a first surface of the component. The first end of the tip may be conically shaped. The pin may be configured to move between a first position and a second position. The pin may be slidably engaged with the one or more probes and may comprise a first end configured for insertion into the aperture in the component such that the one or more probes are configured to contact a second surface of the component. An axis of the pin may be substantially aligned with an axis of the tip. The measurement device may be coupled to the tip and configured to measure a value indicating a grip length. The receiving unit may be configured to receive data transmitted by the gauge.

According to one embodiment, a method includes inserting one or more probes of a grip gauge through an aperture in a component. The grip gauge may include a tip and a pin. The tip may be slidably engaged with the one or more probes and may comprise a first end configured to contact a first surface of the component. The pin may be configured to move between a first position and a second position. The pin may be slidably engaged with the one or more probes and configured for insertion into the aperture in the component such that the one or more probes are configured to contact a second surface of the component. An axis of the pin may be substantially aligned with an axis of the tip. The method may further include determining a grip length for a fastener to be used in the aperture in the component. The grip length may be determined based on a measurement performed using the tip.

Technical advantages of certain embodiments may include reducing measurement error, improving measurement repeatability by eliminating variation among operators, and improving operator ergonomics and comfort. Certain embodiments simplify gauge operation. For example, an operator may insert the probes into the measured aperture without manipulating other features of the gauge. The gauge may advantageously measure the part and transmit data related to the measurement on its own, thereby requiring the operator to simply move the gauge from aperture to aperture. Certain embodiments may advantageously enable automated selection of appropriate fasteners and efficient transmission and storage of measurement data. For example, certain embodiments may automate transmission and storage of measurement data, and data associating an appropriate fastener with the measured aperture may be stored for later reference. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
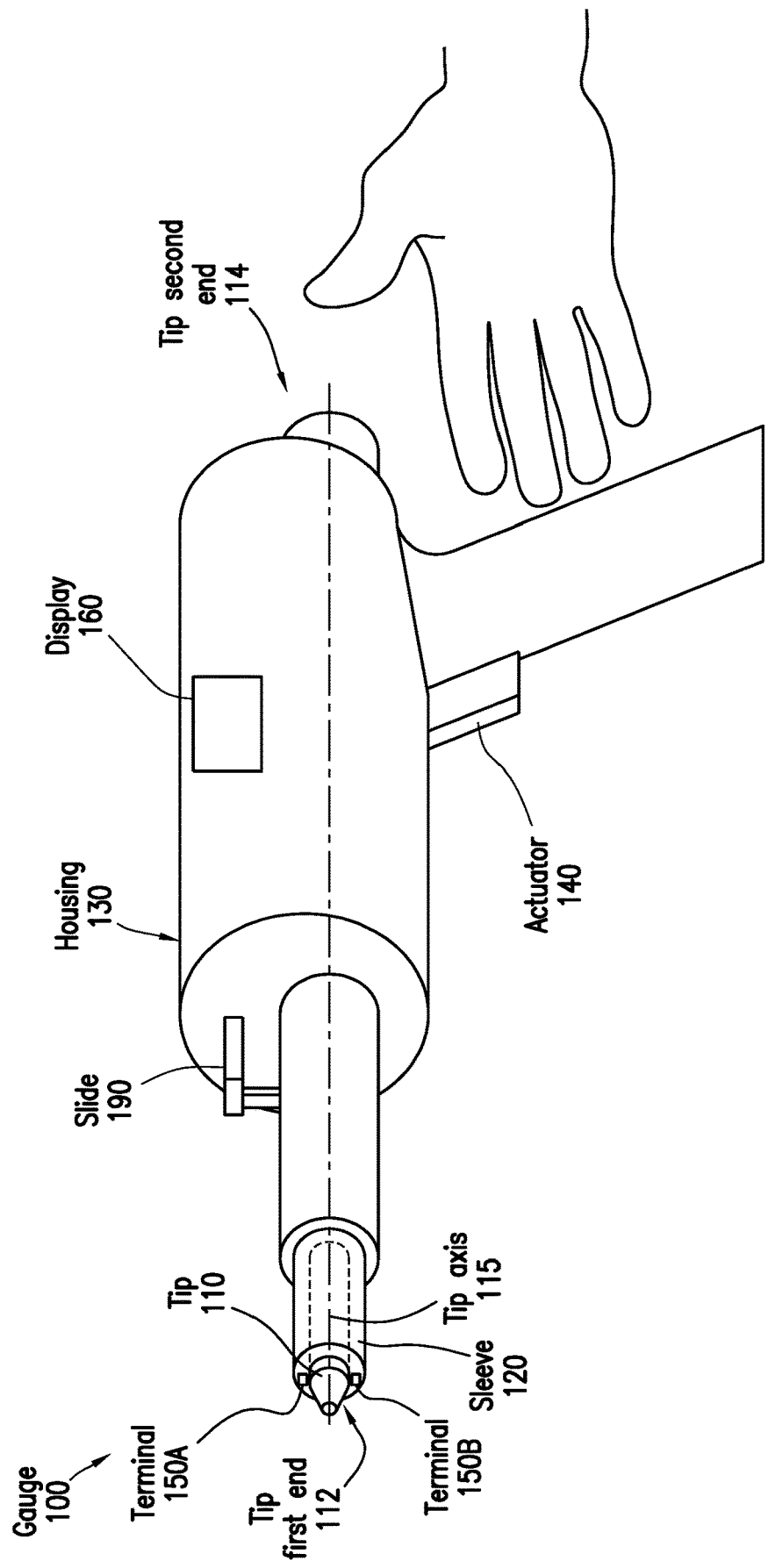
FIG. 1 is a diagram that illustrates an example gauge for measuring grip length, according to certain embodiments.

It is important during the manufacturing process of aircraft and other vehicles or machinery that the fasteners installed into a drilled aperture are the right grip length in order to ensure that the part tightens down properly. The grip length of a fastener refers to the length from the head of a fastener down to where the fastener shank or body ends and the fastener threads start. If a part does not tighten down properly, there could be gaps that arise or areas of force concentration that can cause fracturing. Existing approaches to measuring grip length are manual, of questionable accuracy, and difficult to repeat in an ergonomic manner.

The present disclosure contemplates various embodiments that may address deficiencies associated with existing approaches. The teachings of the present disclosure recognize that a grip gauge with a shaped tip may permit reliable and accurate measurement of grip length in an ergonomic and automated manner. The following describes apparatuses, systems, and methods of a grip gauge with a shaped tip for providing these and other desired features.

Accordingly, aspects of the disclosure include an apparatus that, in one embodiment, includes one or more probes, a tip, a pin, and a measurement device. The one or more probes may be configured for insertion through an aperture in a component. The tip may be slidably engaged with the one or more probes and include a first end configured to contact a first surface of the component. The first end of the tip may be conically shaped. The pin may be slidably engaged with the one or more probes and include a first end configured for insertion into the aperture in the component such that the one or more probes are configured to contact a second surface of the component. The pin may be configured to move between a first position and a second position. An axis of the pin may be substantially aligned with an axis of the tip. The measurement device may be coupled to the tip and configured to measure a value indicating a grip length.

The present disclosure may provide numerous advantages. Certain embodiments may advantageously reduce measurement error. Certain embodiments may improve measurement repeatability by eliminating variation among operators or measurements. For example, certain embodiments provide mating with and clamping onto a measured component, reducing the potential for operator error or movement of the gauge. Certain embodiments may improve operator ergonomics and comfort. For example, an operator may need only perform simple operations—holding a handle, inserting a gauge into an aperture, and pushing a button—to take a measurement. Certain embodiments simplify gauge operation. For example, an operator may insert one or more probes into an aperture and take a measurement without manipulating other features of the gauge. The gauge may advantageously measure the part and transmit data relating to the measurement on its own, thereby requiring the operator to simply move the gauge from aperture to aperture. Reduction of measurement variability and automatic measurement and transmission of data may reduce the time required for an operator to measure an assembly. Certain embodiments may advantageously enable automated selection of appropriate fasteners and efficient transmission and storage of measurement data. For example, certain embodiments may automate transmission and storage of measurement data upon measurement, and data associating an appropriate fastener with the measured aperture may be stored for later reference. Certain embodiments associating gauge configuration data to grip length measurement data may ease measurement validation and speed fastener selection and assembly. Other advantages may be readily apparent to one having skill in the art. Certain embodiments may have none, some, or all of the recited advantages.

Figure 3:
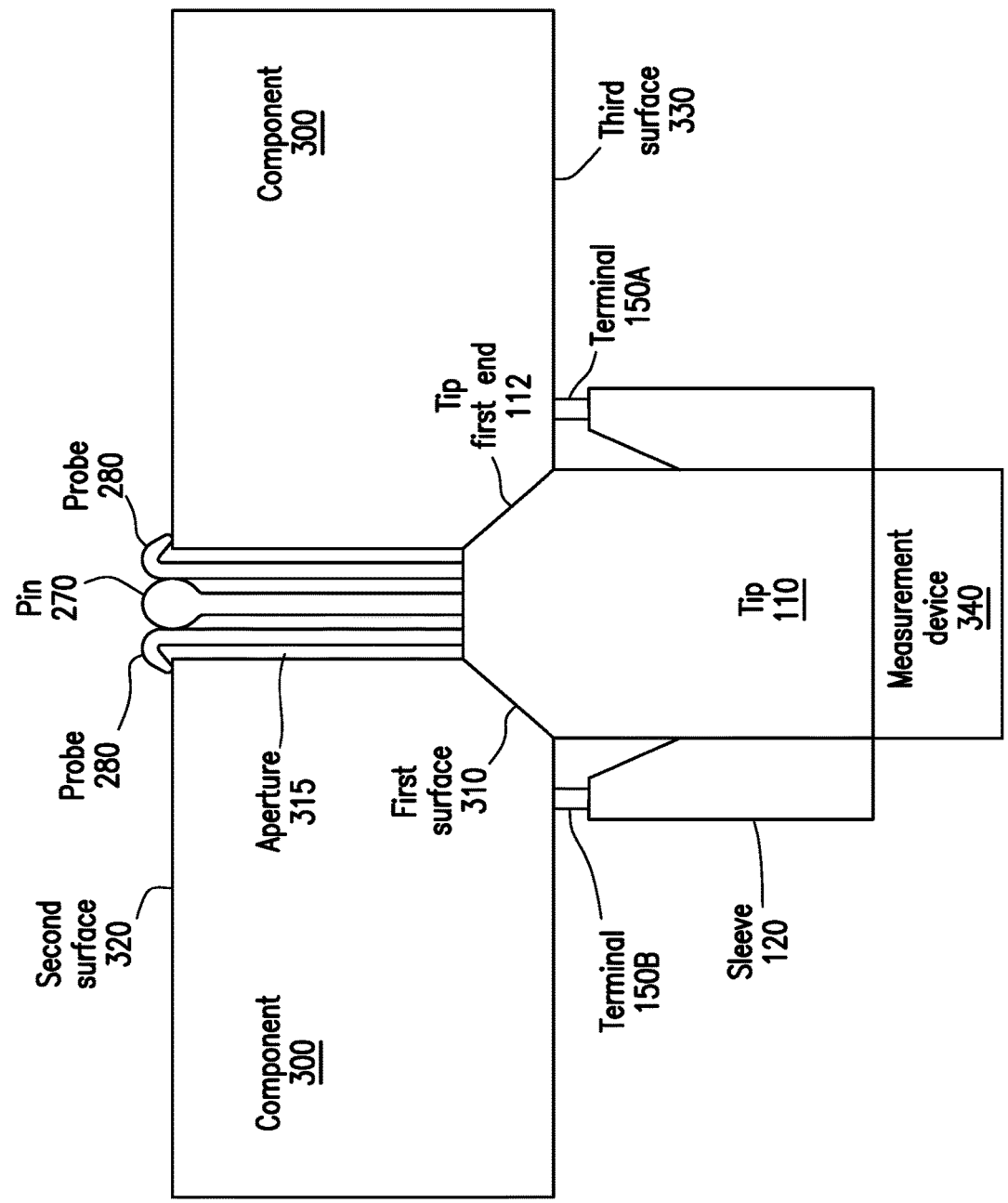
FIG. 3 is a diagram that illustrates the example gauge of FIG. 1 inserted through an aperture, according to certain embodiments.
Figure 4:
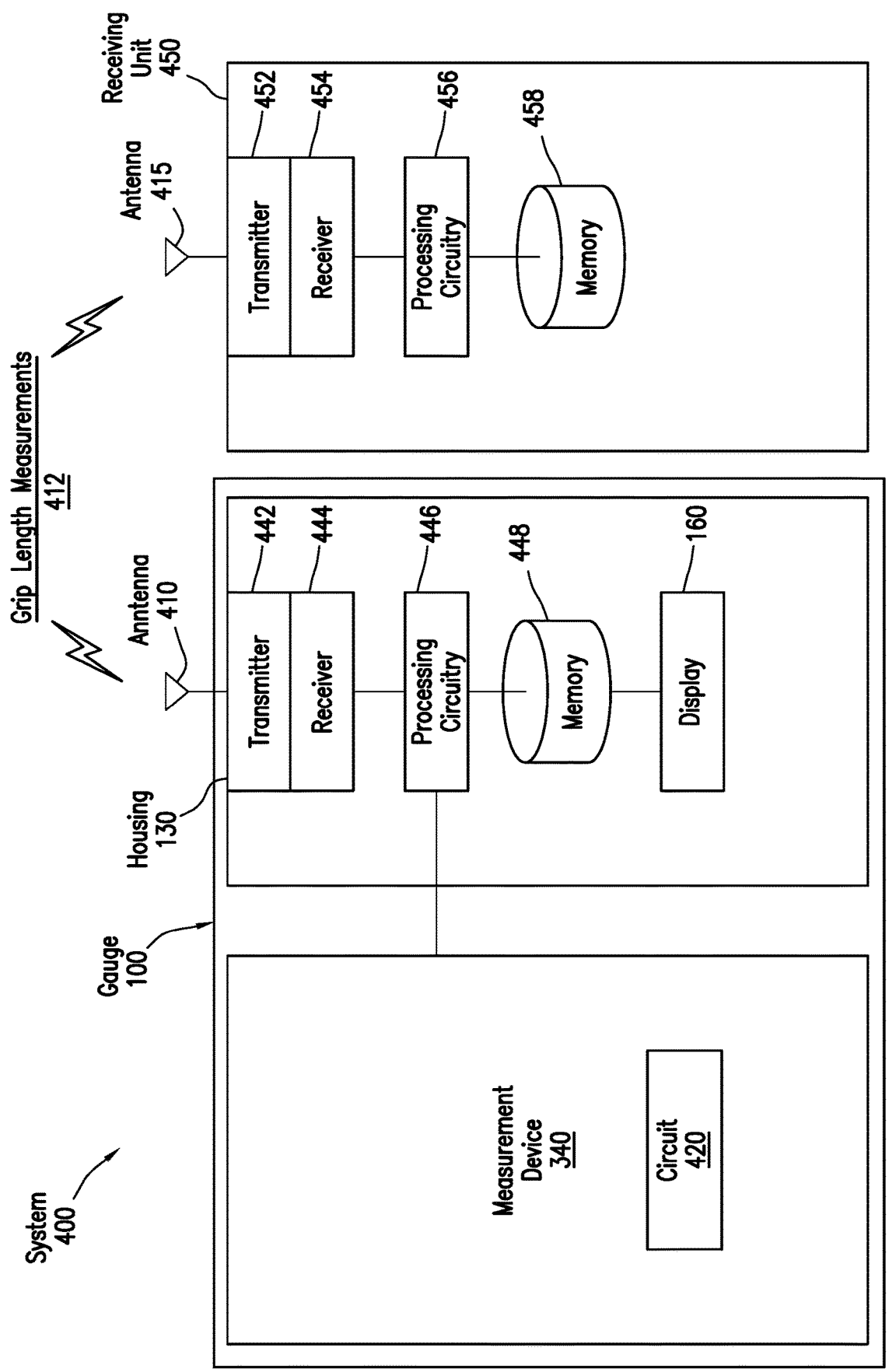
FIG. 4 is a schematic diagram of an example system employing the example gauge of FIG. 1, according to certain embodiments.
Figure 5:
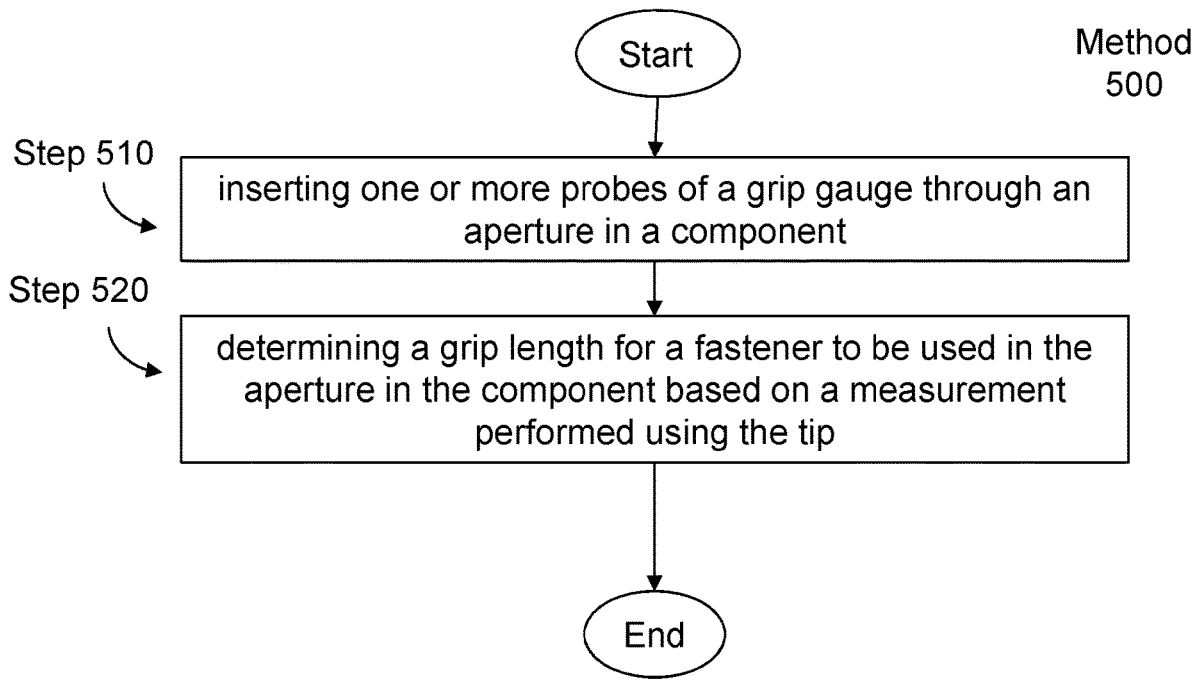
FIG. 5 is a flow diagram of an example method for measuring grip length, according to certain embodiments.

Additional details are discussed with reference to FIGS. 1 through 5. FIG. 1 illustrates an example gauge for measuring grip length, and FIGS. 2A and 2B respectively illustrate a first and second state of operation of a portion of the example gauge. FIG. 3 illustrates a portion of the example gauge of FIG. 1 inserted through an aperture. FIG. 4 is a schematic diagram of an example system employing the example gauge of FIG. 1. FIG. 5 is a flow diagram of an example method for measuring grip length.

FIG. 1 is a diagram that illustrates an example gauge for measuring grip length, according to certain embodiments. FIG. 1 illustrates an example gauge 100 that includes a tip 110 (including a tip first end 112, a tip second end 114, and a tip axis 115), a sleeve 120, a housing 130, an actuator 140, terminals 150A and 150B, a display 160, and a slide 190. Generally, gauge 100 may be used to measure grip length in apertures. As explained above, grip length of a fastener refers to the length from the head of a fastener down to where the fastener shank or body ends and the fastener threads start.

Tip 110 may be a structure of gauge 100 configured to make contact with a component to be measured in an embodiment. Tip 110 may facilitate accurate and reliable grip length measurements. Tip 110 may have any suitable shape and dimensions, and the shape and dimensions of tip 110 may vary according to different implementations of gauge 100. For example, tip 110 may be sized based on a specific diameter of the aperture being measured. The shape and dimensions of tip 110 may be based on the shape and dimensions of the aperture in which tip 110 is to be inserted. This may advantageously restrict movement of tip 110 as it moves in and out of the aperture in the component, thereby preventing differences in measurements due to variations in an amount of movement of tip 110 among operators. Tip 110 may be made from any suitable material. As particular examples, tip 110 may be made from metal (e.g., aluminum) or plastic (e.g., Delrin®), or any other suitable material or any suitable combination of materials. In certain embodiments tip 110 may be made of metal to reduce wear on tip 110 and increase tip 110 lifetime. In certain embodiments, tip 110 may be made of plastic to reduce the potential for damage to other components, such as the measured component.

In certain embodiments, tip 110 may be positioned at least partially within housing 130. For example, one end of tip 110 (e.g., tip first end 112) may be located outside of housing 130, and the other end (e.g., tip second end 114) may be located inside housing 130. Tip 110 may be slidably engaged with housing 130 such that different parts of tip 110 are located inside housing 130 as tip 110 slides relative to housing 130.

In certain embodiments, tip 110 may at least partially surround one or more probes (discussed below with reference to FIGS. 2A-2B). For example, tip 110 may be cylindrically shaped and hollow in a region containing one or more probes. Tip 110 may be slidably engaged with one or more probes. In certain embodiments, tip 110 may at least partially surround a pin. Tip 110 may be slidably engaged with the pin. Tip 110 may include tip first end 112 and tip second end 114.

Tip first end 112 may be an end portion of tip 110. Tip first end 112 may be configured for insertion in an aperture in a component. Tip first end 112 may be shaped such that, upon insertion of tip 110 in the measured aperture, tip first end 112 permits insertion of tip 110 up to a certain depth. In certain embodiments, the shape of tip first end 112 corresponds to the shape of a machined or otherwise manufactured feature in the measured component. For example, tip first end 112 may be conically shaped to match a conical countersink in the measured component. As another example, tip first end 112 may be shaped to mate with a feature in an injection-molded component. Shaping of tip first end 112 advantageously permits measurement of lengths other than the stack thickness of the measured component. As used herein, stack thickness is the distance from the front surface to the back surface of a component (i.e., the total thickness of the component). Shaping of tip first end 112 may also restrict movement of tip 110 as it contacts the component, thereby preventing differences in measurements due to variations in an amount of movement of tip 110 between operators or measurements. Tip first end 112 may be located outside of housing 130 while another part of tip 110 may be located within housing 130.

Tip second end 114 may be an end portion of tip 110 located opposite tip first end 112. Tip second end 114 may be positioned outside of housing 130, inside housing 130, or partially inside and partially outside housing 130. In certain embodiments, as tip 110 slides relative to housing 130, tip second end 114 may move from inside housing 130 to outside housing 130. In certain embodiments, an operator of gauge 100 may interact with tip second end 114 to slide tip 110 relative to housing 130. For example, an operator may push tip second end 114 toward housing 130 such that tip first end 112 extends farther from housing 130.

Tip axis 115 may correspond to an axis of tip 110. For example, tip axis 115 may be an axis through the center of tip 110, as shown in FIG. 1. In certain embodiments, tip axis 115 may substantially align with an axis of an aperture (e.g., an axis through the center of the aperture and extending through the depth of the aperture or the stack thickness of the component) in a component in which gauge 100 is intended to be used. Alignment of tip axis 115 and an axis of the measured aperture (e.g., an axis through the center of the aperture and extending through the depth of the aperture or the stack thickness of the component) has the advantage of providing more accurate grip length measurements. In certain embodiments, alignment of tip 110 with the measured aperture permits measurement along the appropriate dimension (e.g., an axis through the center of the aperture and extending through the depth of the aperture or the stack thickness of the component). For example, the grip length measured may be used to select a fastener substantially aligned with the axis of the measured aperture upon installation, such that measurement along the axis of the measured aperture (rather than any other dimension) permits selection of the appropriate fastener.

Sleeve 120 may be a structure that at least partially or fully houses tip 110. Sleeve 120 may be located near tip first end 112 of tip 110. Sleeve 120 may protect tip 110 and facilitate reliable and repeatable contact with the component to be measured. In certain embodiments, sleeve 120 may be configured to contact a component to be measured. Sleeve 120 may be slidably engaged with tip 110. Sleeve 120 may fully or partially surround tip 110. For example, sleeve 120 may surround tip 110 in a manner that allows a user to see tip first end 112 as the user aligns tip 110 with an aperture to be measured. Sleeve 120 may have any suitable dimensions and may be made of any suitable material. The dimensions of sleeve 120 may vary according to different implementations of gauge 100. Sleeve 120 may be suitably shaped such that terminals 150A and 150B make contact with contoured surfaces (i.e., surfaces not limited to a 2-D plane). This may advantageously ensure that tip 110 is well-seated in an aperture, reducing measurement error due to movement of tip 110.

The material forming sleeve 120 may vary according to different implementations of gauge 100. For example, sleeve 120 may be formed of metal or plastic (e.g., Teflon). Considerations informing the material selected for sleeve 120 may include, for example, wear on sleeve 120, weight of sleeve 120, rigidity of sleeve 120, and potential for damage to the measured component from sleeve 120. In certain embodiments, the dimensions of sleeve 120 may correspond to features in the measured component. For example, sleeve 120 may be sized to have a diameter larger than the measured aperture to avoid insertion in the aperture. Sleeve 120 may have one or more terminals 150A-150B positioned on sleeve 120. For example, sleeve 120 may be cylindrically shaped, with terminals 150A and 150B placed on opposite sides of the cylinder (180 degrees apart). Sleeve 120 may be slidably engaged with housing 130, and sleeve 120 may retract into housing 130 as it slides relative to tip 110.

Housing 130 may be a housing that protects components in gauge 100 from the external environment and provides an operator of gauge 100 with an ergonomic interface. For example, housing 130 may be a hollow cylinder, containing certain components of gauge 100, with a handle attached that permits an operator to comfortably hold gauge 100. Housing 130 may be slidably engaged with tip 110 and/or sleeve 120. Housing 130 may partially contain tip 110 and/or sleeve 120. The portions of tip 110 and/or sleeve 120 located within housing 130 may change as tip 110 and sleeve 120 slide relative to housing 130. Housing 130 may partially or fully contain slide 190. Housing 130 may be coupled to one or more probes (described below with reference to FIGS. 2A-2B) inserted into an aperture in a component.

In certain embodiments, housing 130 may contain any suitable combination of hardware or software to provide an audible or visual indication to an operator of gauge 100. For example, the indication may be an audible or visual signal (e.g., a beep or light) that indicates to the user of gauge 100 that a measurement of the grip length has been successfully obtained.

In certain embodiments, housing 130 may contain one or more power sources that provide power to circuits and/or systems of gauge 100. For example, housing 130 may contain one or more batteries that provide power for electronics of gauge 100. In certain embodiments, housing 130 may include features that permit a user to easily access one or more power sources. For example, an external surface of housing 130 may include a battery access area. This may have the advantage of permitting a user to change power sources without tools.

The dimensions and material forming housing 130 may vary according to different implementations of gauge 100. In certain embodiments, housing 130 may be made from metal, rubber, plastic, or any other suitable material or any suitable combination of materials. The dimensions of housing 130 may be chosen to improve the ergonomic experience of an operator.

In certain embodiments, housing 130 includes features that support ergonomic operation of gauge 100. For example, housing 130 may include a handle used by an operator to perform ergonomic and repeatable grip length measurements. In certain embodiments, housing 130 may include an actuator 140 configured such that an operator of gauge 100 can control gauge features in an ergonomic manner.

Actuator 140 may be a mechanism for controlling the position of pin 270 (discussed further with respect to FIGS. 2A-2B below). Actuator 140 may be coupled to pin 270 and configured to move pin 270 between a first, retracted position and a second, extended position.

Actuator 140 may be implemented in various ways according to different implementations of gauge 100. Actuator 140 may move pin 270 between a first, retracted position and a second, extended position based directly or indirectly on operator input. An operator may control actuator 140 by any number of mechanisms, including, for example, a button, a switch, a dial, a rod, a lever, a wheel, or a piston. For example, an operator may hold a handle in housing 130 and pull a trigger to extend or retract pin 270. This actuation mechanism may provide the advantage of enabling repeated measurement in an ergonomic manner. In certain embodiments, actuator 140 may move pin 270 based on receipt of a control signal. For example, an electronic actuator may receive a signal indicating that terminals 150A and 150B have made contact with the component to be measured and move pin 270 into a second, extended state in response. In certain embodiments, actuator 140 may automatically control the position of pin 270 based on the configuration of gauge 100. For example, actuator 140 may receive a control signal and move pin 270 into a first, retracted state when a measurement has been performed. Actuator 140 may be responsive to both user input and control signals from another device. For example, an electronic actuator may extend pin 270 based on receipt of a control signal, but override any signal received and place pin 270 back in a retracted state when a user manually presses a button or switch. Actuator 140 may move pin 270 by any suitable mechanism. For example, the mechanism by which actuator 140 moves pin 270 may be hydraulic, pneumatic, mechanical, or electrical.

Terminals 150A and 150B may be components positioned on sleeve 120 in a manner that permits gauge 100 to determine whether terminals 150A and 150B have made contact with a surface of a component to be measured. For example, terminals 150A and 150B may be buttons, tabs, or knobs configured to contact a surface of a component as tip 110 is inserted into an aperture in the component. The location, shape, and number of terminals may vary according to different implementations of gauge 100. The dimensions and material forming terminals 150A and 150B may vary according to different implementations of gauge 100. In certain embodiments, terminals 150A and 150B may be made from metal (e.g., aluminum or copper), rubber, plastic, or any other suitable material or any suitable combination of materials. Plastic or rubber terminals 150A and 150B may advantageously reduce friction or scratching between the terminals and the front surface of the measured component. Metal terminals 150A and 150B may permit a circuit to determine whether terminals 150A and 150B have made contact with a measured component based on an electronic measurement.

Display 160 may be any suitable interface that displays information to an operator of gauge 100. Display 160 may display information related to grip length measurements or the configuration of gauge 100 to a user. For example, in certain embodiments display 160 may be a digital readout or an indicator light (e.g., an LED light). In some cases, display 160 may indicate whether a successful measurement has been performed (e.g., by displaying a digital readout of the measurement or illuminating an indicator light indicating a successful measurement). The indication may be provided in any suitable manner. As one example, the indication may be an LED light that indicates whether a measurement of the grip length has been successfully obtained (e.g., a green LED light may indicate a successful measurement).

Display 160 may display information relating to operation of gauge 100 and measurements of grip length in any suitable manner. An operator of gauge 100 may reference the information presented on display 160 when configuring gauge 100 or performing a grip length measurement. For example, display 160 may indicate that pin 270 is in a first, retracted position or a second, extended position. As another example, display 160 may indicate whether terminals 150A and 150B have made contact with the measured component. In certain embodiments, display 160 displays information relating to a grip length measurement. Display 160 may display information indicating a grip length and a fastener to be used in a measured aperture. For example, display 160 may display the grip length measured and an associated dash number identifying the fastener to be used (or any other information that identifies a fastener to be used) for that grip length. Display 160 may display a value indicating a grip length in real-time, in a manner that permits the gauge user to assess the stability of the grip length measurement.

In certain embodiments, display 160 may present information associated with completed measurements. Display 160 may present past measurement data based on user input. For example, display 160 may present past measurement data associated with an aperture in response to an operator inputting an index number associated with that aperture. In certain embodiments, display 160 may present past measurement data when one or more conditions relating to the status or configuration of gauge 100 are met. For example, display 160 may present a previously measured grip length and associated fastener when gauge 100 is inserted into a previously measured aperture and pin 270 is in a first, retracted state.

The information presented on display 160 may vary according to different implementations of gauge 100. Information presented on display 160 may relate to, for example, measured grip length, an associated fastener, the type of fastener intended to be used, measurement stability, measurement status, the number of measurements taken, the configuration of gauge 100, or wireless transmission of measurement data.

Display 160 may be positioned in any manner (e.g., on the side) on housing 130. The location of display 160 may also vary according to different implementations of gauge 100. For example, display 160 may be located on or integrated into an external surface of housing 130.

Display 160 may include a user interface permitting a user to configure gauge 100. In certain embodiments, a user may configure settings for performing grip length measurements. For example, a user may calibrate gauge 100 to automatically adjust a grip length measurement value based on the type of fastener intended to be used in the measured aperture. In certain embodiments, a user may configure settings for data transmission to a receiving unit (discussed further below with respect to FIG. 4). For example, a user may configure gauge 100 to send an index for a measured aperture associated with a grip length measurement to a receiving unit. In certain embodiments, a user may configure settings for the information displayed on display 160. For example, a user may set display 160 to present a measured grip length value but not whether terminals 150A and 150B were in contact with the measured component during the measurement.

Slide 190 may be a measurement device for determining the position of tip 110. For example, slide 190 may determine the position of tip 110 relative to housing 130. Slide 190 may be coupled to tip 110 in a manner that permits measurement of grip length based on the position of tip 110. In certain embodiments, the position of slide 190 indicates the position of tip 110 and determines the value of grip length measured. As used herein, grip length of a fastener refers to the length from the head of a fastener down to where the fastener shank or body ends and the fastener threads start. In certain embodiments, a linear encoder may measure the position of slide 190. In certain embodiments, slide 190 may be located, partially or fully, within housing 130. For example, one end of slide 190 may be attached to tip 110 outside of housing 130, with the other end attached to a circuit (e.g., circuit 420 discussed further below with reference to FIG. 4) located within housing 130 that measures and records a value indicating a grip length. In other embodiments, slide 190 may be located external to housing 130. Methods of measuring grip length may vary according to different implementations of gauge 100. Although illustrated with slide 190 in FIG. 1, measurement of grip length may be performed by any suitable measurement device, as discussed further below.

Slide 190 may be calibrated in any suitable way. For example, gauge 100 may be placed in calibration mode and then used to measure a reference component of known thickness. Calibration of slide 190 may include an offset or adjustment. For example, after calibration, measurements may be adjusted to remove the depth of tip first end 112 or to remove a constant offset based on the type of fastener intended to be used in the aperture. In certain embodiments, calibration may be performed with multiple measurements or multiple reference components of varying thickness. In certain embodiments, calibration may be performed without measuring a reference component. For example, tip 110 may have a stop that limits how far it can slide, and slide 190 may be calibrated by pushing tip 110 until it reaches the position of the stop.

Figure 2B:
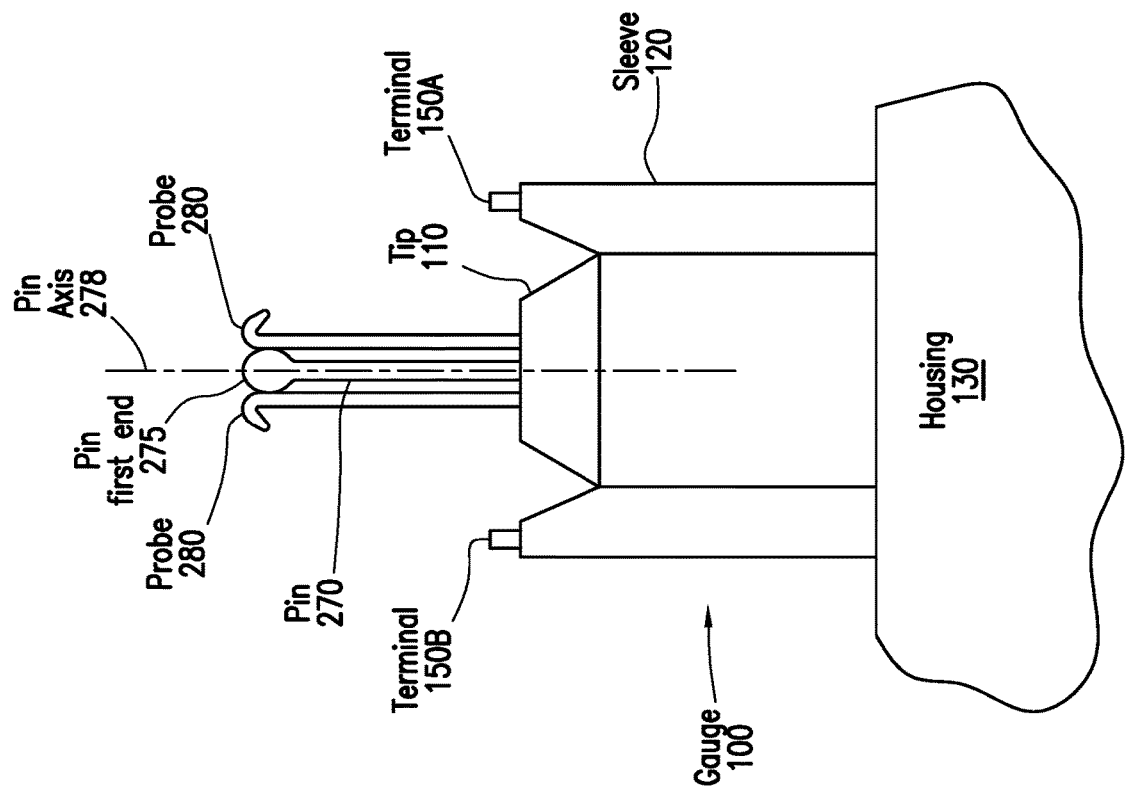
FIG. 2B is a diagram that illustrates the example gauge of FIG. 1 in a second state of operation, according to certain embodiments.
Figure 2A:
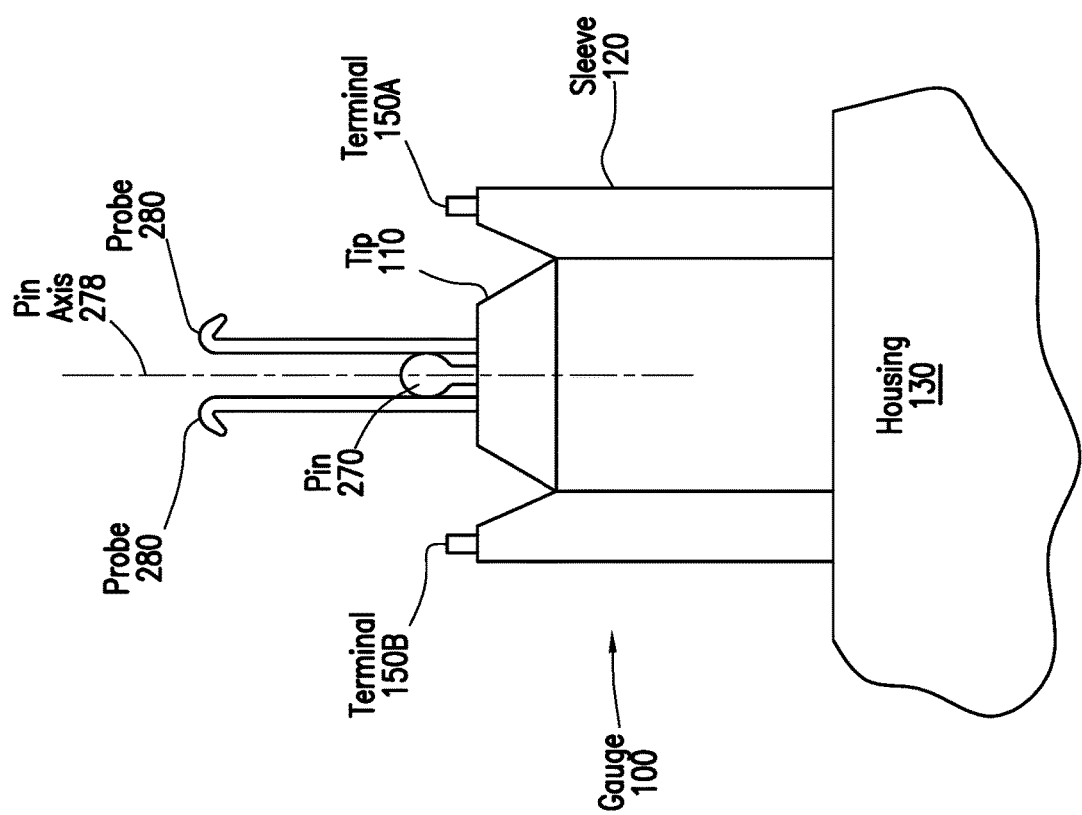
FIG. 2A is a diagram that illustrates the example gauge of FIG. 1 in a first state of operation, according to certain embodiments.

FIGS. 2A-2B respectively illustrate a portion of the example gauge of FIG. 1 in an example first and second state of operation, according to certain embodiments. FIG. 2A shows pin 270 in a first, retracted state, and FIG. 2B shows pin 270 in a second, extended state. FIGS. 2A-2B also show additional details of gauge 100 not illustrated in FIG. 1, including pin 270 (including pin first end 275 and pin axis 278), and probes 280.

Pin 270 may be a structure configured for insertion in an aperture in a component to be measured. For example, pin 270 may be a rod, shaft, pin, tube, or dowel. Pin 270 may facilitate contact between probes 280 and the component. In certain embodiments, gauge 100 (or the operator of gauge 100) may use the position of pin 270 to determine whether to perform a measurement or other operation. For example, an operator may not perform a grip length measurement until pin 270 has been inserted into the aperture to be measured.

Pin 270 may be coupled to actuator 140 in a manner that permits the operator of gauge 100 to move pin 270 between states. FIG. 2A illustrates part of gauge 100 in a first state of operation, when pin 270 is in a first, retracted state. FIG. 2B illustrates part of gauge 100 in a second state of operation, when pin 270 is in a second, extended state. Pin 270 may be slidably engaged with probes 280 to permit movement of pin 270 between a first, retracted position and a second, extended position.

The dimensions of pin 270 may vary according to different implementations of gauge 100. The diameter of pin 270 may be determined based on the diameter of the measured aperture. For example, the diameter of pin 270 may be determined in coordination with the dimensions of probes 280 to permit insertion of both pin 270 and probes 280 through the measured aperture, but with minimal tolerance between probes 280 and the aperture such that pin axis 278 remains substantially aligned with the axis of the aperture to be measured. Similarly, the length of pin 270 may be determined based on the approximate depth of the measured aperture. Determining the dimensions of pin 270 based on the measured aperture may advantageously enable repeatable insertion of pin 270 and probes 280 through multiple apertures in a component without damage to the component or gauge 100.

Pin 270 may be made from any suitable material or combination of materials. Pin 270 may be made from metal, rubber, plastic, or any other suitable material or any suitable combination of materials. For example, pin 270 may be made of a rigid metal (e.g. steel) to minimize deflection upon contact with probes 280.

Pin first end 275 may be an end of pin 270 configured for insertion in an aperture in a component such that probes 280 are configured to contact a surface of the component. In certain embodiments, the diameter of pin 270 may increase near pin first end 275. For example, pin first end 275 may be a bulb with a diameter larger than the diameter of the rest of pin 270. This may provide the advantage of forcing additional contact with probes 280 when pin 270 is in a second, extended state.

Pin axis 278 may correspond to an axis of pin 270. For example, pin 270 may be cylindrical, with pin axis 278 corresponding to an axis through the center of the cylinder as shown in FIGS. 2A and 2B. In certain embodiments, pin axis 278 may substantially align with the axis of an aperture in a component in which gauge 100 is intended to be used. In certain embodiments, pin axis 278 may be substantially aligned with tip axis 115. Aligning pin 270 with tip 110 and the axis of the measured aperture may advantageously restrict movement of tip 110 and probes 280, reducing measurement error between different operators and across measurements.

In certain embodiments, pin 270 may be extended in a continuous fashion to any depth between a first, retracted state and a second, extended state. For example, an operator may manipulate an actuator (e.g., rotate a wheel) coupled to pin 270 until pin 270 is extended to the midpoint of a first, retracted state and a second, extended state. In certain embodiments, pin 270 may be moved by an operator directly (e.g., without actuator 140).

In certain embodiments, pin 270 may contact probes 280 when in the second, extended state in a manner that prevents probes 280 from bending inward. In certain embodiments, gauge 100 may not be removed from the measured component when pin 270 is in a second, extended state. For example, contact between probes 280 and the backside of the component may prevent removal of the gauge 100 from the component to be measured. In certain embodiments, pin 270 and probes 280 may be inserted through the aperture to be measured when pin 270 is in a second, extended state. In other embodiments, the dimensions of pin 270 and probes 280 may be selected such that pin 270 may be moved into a second, extended state only after probes 280 have been inserted through the aperture to be measured.

Probes 280 may be one or more structures configured to clamp onto a surface of a component to be measured when inserted through an aperture in the component. In certain embodiments, clamping of probes 280 onto a component prevents removal of gauge 100 from the component during a measurement. In certain embodiments, clamping of probes 280 provides a reference plane for measurement of grip length. Probes 280 may be configured to contact or clamp onto a backside of the component being measured. Probes 280 may be coupled, directly or indirectly, to housing 130 in any suitable manner. For example, probes 280 may be bolted, threaded, glued, clamped, or welded to housing 130. In certain embodiments, probes 280 and housing 130 may be machined or otherwise manufactured from a single piece of material. The dimensions and material forming probes 280 may vary according to different implementations of gauge 100. For example, the dimensions of probes 280 may be determined, in coordination with dimensions of pin 270, based on the size (e.g., diameter and depth) of the aperture to be measured. The dimensions of probes 280 may be chosen such that probes 280 contact the backside of the measured component when pin 270 is in the second, extended state. In certain embodiments, probes 280 may include a notch or indentation near the part of probes 280 that contact the backside of the measured component. This may have the advantage of providing an accurate measurement even when there is a burr or chamfer near the edges of the measured aperture. In certain embodiments, probes 280 may contact the backside of the component being measured when pin 270 is in a first, retracted state. Probes 280 may be made from metal, rubber, plastic, or any other suitable material or any suitable combination of materials. For example, probes 280 may be brass or bronze such that they remain sufficiently stiff for insertion through the measured aperture but do not scratch or damage the aperture or the component.

As noted above, FIG. 2A illustrates pin 270 in a first, retracted state, and FIG. 2B illustrates pin 270 in a second, extended state. As an example embodiment of operation, pin 270 may be in a first, retracted state as shown in FIG. 2A. In certain embodiments, probes 280 may bend inward when pin 270 is in a first, retracted state such that probes 280 may be easily inserted into or removed from the measured aperture. Actuator 140 may be actuated to move pin 270 from a first, retracted state, as in FIG. 2A, to a second, extended state, as in FIG. 2B. For example, actuator 140 may move pin 270 to a second, extended state once tip first end 112 has been in contact with the component to be measured for a certain duration of time (e.g. 0.5 seconds). As another example, actuator 140 may move pin 270 to a second, extended state once a value indicating a grip length has remained within a tolerance (e.g. +/−0.005 inches) for a certain duration of time.

FIG. 3 is a diagram that illustrates a portion of the example gauge 100 of FIG. 1 inserted through an aperture, according to certain embodiments. The portion of gauge 100 illustrated in FIG. 3 includes tip 110 (including tip first end 112), sleeve 120, terminals 150A and 150B, pin 270, probes 280, and measurement device 340. The component to be measured, component 300, may include first surface 310, aperture 315, second surface 320, and third surface 330.

Component 300 may include one or more parts containing one or more apertures 315. Component 300 may comprise a single part or a stack of multiple parts. For example, component 300 may include a part used in the manufacture and assembly of aircraft as well as the skin of the aircraft or a similar mounting location. Component 300 may be made of any suitable material or combination of materials.

First surface 310 may be any surface of component 300 whose depth needs to be accounted for in a grip length measurement. First surface 310 may be a surface of component 300 located in aperture 315. First surface 310 may be created by any suitable manufacturing technique (e.g., machining, molding, etc.). For example, first surface 310 may be created by electrical discharge machining. In certain embodiments, first surface 310 may be created by machining a countersink in component 300. For example, first surface 310 may be a conical surface created by machining a conical countersink. Gauge 100 may be configured to contact first surface 310 during measurement of aperture 315. For example, tip first end 112 of gauge 100 may be configured to contact first surface 310 during the measurement process.

Aperture 315 may be any aperture of component 300. Aperture 315 may include one or more apertures in one or more parts stacked together. In certain embodiments, the diameter of aperture 315 may vary along the length of the aperture. For example, aperture 315 may include a countersink. As another example, aperture 315 may comprise holes of varying diameters, each drilled in a separate part. In certain embodiments, installation of component 300 in an assembly requires insertion of a fastener in aperture 315. Measurement of grip length may permit a user to select an appropriate fastener for aperture 315. As shown in FIG. 3, a portion of gauge 100 (e.g., pin 270 or probes 280) may be inserted into aperture 315 of component 300 as part of a grip length measurement.

Second surface 320 may be a surface of component 300. Second surface 320 may be in contact with one or more probes 280 during a grip length measurement. In certain embodiments, second surface 320 may be the backside of component 300. For example, second surface 320 may not be visible to an operator inserting gauge 100 into aperture 315. In certain embodiments, second surface 320 may be on the opposite side of component 300 as third surface 330. In certain embodiments, the distance from a location on first surface 310 (e.g., at the end of tip first end 112, as shown in FIG. 3) to a location on second surface 320 (e.g., where second surface 320 intersects aperture 315) may define a grip length for a fastener intended to be used in aperture 315.

Third surface 330 may be a surface of component 300. In certain embodiments, third surface 330 may be the front side of component 300. For example, an operator of gauge 100 may see third surface 300 while inserting gauge 100 into aperture 315. Third surface 330 may be on the opposite side of component 300 as second surface 320. In certain embodiments, the distance from third surface 330 to second surface 320 may define a stack thickness of component 300. Third surface 330 may be in contact with terminals 150A and 150B during a grip length measurement. As gauge 100 is inserted into aperture 315, terminals 150A and 150B may make contact with third surface 330. Gauge 100 may record, display, and transmit information relating to the status of terminals 150A and 150B. Contact between terminals 150A and 150B and third surface 330 may be required before taking a measurement. As sleeve 120 may be slidably engaged with tip 110, terminals 150A and 150B may press against third surface 330 to keep gauge 100 engaged with component 300.

In certain embodiments, sleeve 120 and tip 110, tip 110 and probes 280, and pin 270 and probes 280 may be slidably engaged in a manner that permits gauge 100 to clamp onto component 300 when probes 280 are inserted through aperture 315. For example, probes 280 may clamp onto second surface 320 when pin 270 has been inserted partially or fully through aperture 315, based on the dimensions and materials chosen for pin 270 and probes 280. Contact from multiple parts of gauge 100 to component 300 may improve measurement accuracy and repeatability by preventing removal of gauge 100 from component 300 during a measurement.

Contact from multiple parts of gauge 100 to component 300 may also improve measurement accuracy by reducing movement of tip 110 due to user error or other environmental factors (e.g., vibration, shock).

In certain embodiments, grip length may be determined based at least in part on a depth of aperture 315 in component 300. In certain embodiments, the grip length may be derived from a measurement of a distance from first surface 310 of component 300 through aperture 315 to second surface 320 of component 300 (e.g., to exclude the depth of tip first end 112). In certain embodiments, the grip length may be derived from a measurement of a distance from third surface 330 of component 300 through aperture 315 to second surface 320 of component 300 to obtain a stack thickness value (e.g., to include the depth of tip first end 112). The measured value may correspond to fastener grip length, or further refinement of the measured value may be performed to obtain the grip length. In certain embodiments, the refinement may be performed by software associated with measurement device 340, processing circuitry, or by another element on data received from gauge 100 (e.g., receiving unit 450 described below in relation to FIG. 4).

Measurement device 340 may be any suitable measurement device for measuring a value indicating a grip length of a fastener for use in aperture 315 of component 300. For example, in certain embodiments, measurement device 340 may include a linear displacement metrology device (including, e.g., slide 190 of FIG. 1). As another example, in certain embodiments measurement device 340 may include a mechanical, capacitive (e.g., a capacitive linear encoder), inductive, or optical displacement sensor. Measurement device 340 may be calibrated to include or exclude part or all of the depth of tip first end 112 (or first surface 310) in measured values. In certain embodiments, measurement device 340 may be configured to adjust a measured value based on any suitable circumstance. For example, measurement device 340 may adjust a measured value based on the type of head on the fastener to be used in aperture 315. Measurement device 340 may be coupled to tip 110, and the measured value may include the distance from the end of tip first end 112 to second surface 320.

Measurement device 340 may be configured to measure a value indicating a grip length when an indicator of the value remains within a tolerance for a predetermined period of time. For example, an operator may insert gauge 100 into aperture 315, and gauge 100 may measure a value indicating a grip length when an indicator of the grip length remains within +/−0.005 inches for 0.5 seconds. Measurement device 340 may be configured to measure a value indicating a grip length in response to input from a user. For example, an operator may insert gauge 100 into aperture 315 and trigger a grip length measurement by pushing a button on gauge 100.

As an example embodiment of operation, a portion of gauge 100 may be inserted through aperture 315. As gauge 100 is inserted into aperture 315, tip first end 112 may contact first surface 310 of component 300. Terminals 150A and 150B (and sleeve 120) may contact third surface 330 as gauge 110 is inserted into aperture 315. As gauge 100 is further inserted into aperture 315, an operator may move pin 270 into a second, extended state such that probes 280 make contact with second surface 320. Probes 280 may clamp onto second surface 320 once pin 270 is inserted through aperture 315, preventing removal of gauge 100 from component 300 until pin 270 is moved into a first, retracted state as shown in FIG. 2A. Gauge 100 may take a measurement in response to user input or based on the configuration of gauge 100. In certain embodiments, once gauge 100 performs a measurement, an operator may move pin 270 into a first, retracted state, permitting probes 280 to bend inward such that they no longer contact second surface 320 and may be removed through aperture 315. In certain embodiments, gauge 100 may move pin 270 into a first, retracted state based on the configuration of gauge 100. An operator may then remove gauge 100 from component 300.

FIG. 4 is a schematic diagram of an example system 400 employing the example gauge 100 of FIG. 1, in accordance with certain embodiments. System 400 may be used to perform grip length measurements and store data related to grip length measurements in a reliable and automated manner. System 400 may include gauge 100 and receiving unit 450. Gauge 100 may include housing 130 and measurement device 340. Measurement device 340 may include circuit 420. In addition, gauge 100 may include the various additional elements of gauge 100 described above in relation to FIGS. 1-3.

In the example embodiment of FIG. 4, measurement device 340 may be communicatively coupled to processing circuitry 446 in housing 130. For example, measurement device 340 may communicate data indicating a measured grip length and data indicating the configuration of gauge 100 when the measurement was performed to processing circuitry 446. Although depicted in FIG. 4 as located outside housing 130, in certain embodiments one or more components of measurement device 340 may be included in housing 130. For example, in certain embodiments circuit 420 may be contained in housing 130. Measurement device 340 may perform a measurement with circuit 420. In certain embodiments, the measurement device 340 may be configured to measure a value indicating a grip length when tip first end 112, probes 280, and/or terminals 150A and 150B make contact with component 300. Measurement device 340 may not perform a measurement until tip first end 112, pin 270, terminals 150A and 150B, or probes 280 meet certain conditions. For example, measurement device 340 may not perform a measurement until tip first end 112 is in contact with first surface 310 and terminals 150A and 150B are in contact with third surface 330. As another example, measurement device 340 may not perform a measurement until pin 270 is in a second, extended position. As another example, measurement device 340 may not perform a measurement until probes 280 are in contact with second surface 320.

Circuit 420 may be one or more circuits or sensors (e.g., a capacitive displacement sensor). Circuit 420 may control one or more operations of gauge 100. Circuit 420 may determine a grip length value based on the position of tip 110. For example, a grip length value may be determined based on the position of tip 110 relative to probes 280 or housing 130. Circuit 420 may also comprise one or more processors that process and communicate measurement data.

Measurement device 340 may use circuit 420 to determine when to perform a measurement or send measurement information. In certain embodiments, measurement device 340 may wait to provide a measurement of grip length to processing circuitry 446 until it reads a consistent measurement of the grip length for a certain period of time (e.g., as measured by circuit 420). The period of time may be any suitable time period. For example, in certain embodiments the time period may be 0.5 seconds. In some cases, the measurement information may be automatically provided upon expiration of a suitable time period. In certain embodiments, the time period may be determined based on the position of pin 270. For example, measurement device 340 may trigger a measurement, or send a measurement to processing circuitry 446, once circuit 420 determines that pin 270 has been in a second, extended state for a certain period of time. In certain embodiments, the time period may be determined based on contact between terminals 150A and 150B and component 300. For example, measurement device 340 may perform a measurement, or send a measurement to processing circuitry 446, once circuit 420 determines that terminals 150A and 150B have been in contact with component 300 for 0.5 seconds.

Circuit 420 may be coupled to terminals 150A and 150B, probes 280, tip 110, and/or pin 270. Circuit 420 may be configured to determine whether terminals 150A and 150B, probes 280, and/or tip 110 have made contact with component 300. For example, electrically conductive terminals 150A and 150B may be fixed to sleeve 120, and circuit 420 may determine that terminals 150A and 150B have contacted component 300 based on an electronic measurement. As another example, terminals 150A and 150B may be coupled to a spring, such that the spring is compressed upon contact with component 300, and circuit 420 may determine that contact has been made based on the degree of compression. In certain embodiments, circuit 420 may determine whether one, both, or neither of terminals 150A and 150B have made contact component 300. In certain embodiments, circuit 420 may prevent a grip length measurement from being taken based on the determination that one of terminals 150A and 150B, probes 280, or tip 110 has not made contact with component 300. For example, circuit 420 may prevent a grip length measurement from being taken until all terminals have made contact with component 300. As another example, circuit 420 may determine whether terminals 150A and 150B have made contact with component 300, and display 160 may indicate to a user whether contact has been made. In certain embodiments, circuit 420 may be configured to determine whether pin 270 is in a first, retracted state or a second, extended state. For example, circuit 420 may prevent performance of a measurement until pin 270 is in a second, extended state. As another example, circuit 420 may determine whether pin 270 is in a first, retracted state or a second, extended state, and display 160 may indicate the state of pin 270 to a user.

In certain embodiments, circuit 420 may record whether one or more terminals 150A and 150B have made contact with component 300 or whether pin 270 is in a first, retracted position or a second, extended position. Recording the status of contact or position may advantageously indicate whether tip 110 is aligned with aperture 315. Circuit 420 may also transmit information relating to contact between terminals 150A and 150B and component 300 to display 160.

In certain embodiments, measurement device 340 may also use circuit 420 to determine whether to perform a measurement. For example, circuit 420 may comprise a sensor that determines whether tip first end 112, probes 280, or terminals 150A and 150B have made contact with component 300. As another example, circuit 420 may be configured to determine whether pin 270 is in a first, retracted state or a second, extended state (e.g., by processing data from a sensor that indicates the position of pin 270).

In certain embodiments, circuit 420 may control the processing and communication of data associated with a grip length measurement. Circuit 420 may include any electronic circuitry, including, but not limited to microprocessors, application specific integrated circuits (ASIC), application specific instruction set processor (ASIP), and/or state machines. Circuit 420 may communicatively couple to one or more of measurement device 340, transmitter 442, receiver 444 (or, in some cases, a transceiver), processing circuitry 446, one or more memory devices 448, or display 160. Circuit 420 may be 8-bit, 16-bit, 32-bit, 64-bit or of any other suitable architecture. Circuit 420 may include an arithmetic logic unit (ALU) for performing arithmetic and logic operations, processor registers that supply operands to the ALU and store the results of ALU operations, and a control unit that fetches instructions from one or more memory devices 448 and executes them by directing the coordinated operations of the ALU, registers and other components. Circuit 420 may include other hardware and software that operates to control and process information. Circuit 420 may execute software stored on one or more memory devices 448 to perform any of the functions described herein. Circuit 420 may control one or more operations of gauge 100 by processing information received by or from measurement device 340, transmitter 442, receiver 444, processing circuitry 446, and one or more memory devices 448. Circuit 420 may be a programmable logic device, a microcontroller, a microprocessor, any suitable processing device, or any suitable combination of the preceding. Circuit 420 is not limited to a single processing or sensor device and may encompass multiple processing and sensor devices.

In the example embodiment of FIG. 4, housing 130 includes antenna 410, transmitter 442, receiver 444, processing circuitry 446, one or more memory devices 448, and display 160. In certain embodiments the functions of transmitter 442 and receiver 444 may be combined into a transceiver. In some cases, housing 130 may not include receiver 444.

Antenna 410 may be a component that sends or receives signals over a wireless interface. Antenna 410 may enable wireless transmission of grip length measurements and associated data to receiving unit 450 (via antenna 415). Antenna 410 may enable transmission or reception of any information processed by measurement device 340, processing circuitry 446, or receiving unit 450, as well as any information stored in memory 458 or memory 448. Antenna 410 may be located inside housing 130 or mounted on the surface of housing 130. Antenna 410 may be communicatively coupled to transmitter 442 and receiver 444 (or, in certain embodiments, to a transceiver).

Transmitter 442 may be any suitable devices operable to transmit information. Transmitter 442 facilitates transmitting wireless signals from gauge 100 to receiving unit 450. In some cases, transmitter 442 may perform suitable processing of the information, communicate to other devices in addition to receiving unit 450, or any combination of the preceding. For example, transmitter 442 may transmit a value indicating a measurement of grip length of a fastener (e.g., the determined measurement or any suitable indication thereof) to a computing device, such as receiving unit 450 and/or any other suitable component. Transmitter 442 may include any suitable hardware and/or software, including protocol conversion and data processing capabilities, to communicate through a LAN, WAN, or other communication systems that allows gauge 100 to exchange information with other components.

Transmitter 442 may be communicatively coupled to measurement device 340. Transmitter 442 may be configured to communicate to receiving unit 450 a value indicating a determined grip length of a fastener for use in aperture 315. Transmitter 442 may also communicate data associated with grip length measurements or data relating to the operation of gauge 100. For example, transmitter 442 may communicate the location of the aperture currently being measured, the type of fastener intended to be used in that aperture, and a grip length measurement. In certain embodiments, transmitter 442 may communicate data indicative of a fastener for use in aperture 315 without communicating a value indicating a determined grip length. Transmitter 442 may communicate to receiving unit 450 in response to input from a user. In certain embodiments, transmitter 442 may communicate a value indicating a determined grip length to receiving unit 450 automatically upon measurement device 340 performing the measurement.

Receiver 444 may be any suitable devices operable to receive information. Receiver 444 facilitates receiving wireless signals at gauge 100 from receiving unit 450. In some cases, receiver 444 may perform suitable processing of the information. Receiver 444 may receive data from receiving unit 450 and/or any other suitable component. Receiver 444 may include any suitable hardware and/or software, including protocol conversion and data processing capabilities, to communicate through a LAN, WAN, or other communication systems that allows gauge 100 to exchange information with other components.

Grip length measurements 412 may include values indicating a grip length, data related to grip length measurements, and/or data related to the configuration of gauge 100 or receiving unit 450.

Processing circuitry 446 may be any electronic circuitry, including, but not limited to microprocessors, application specific integrated circuits (ASIC), application specific instruction set processor (ASIP), and/or state machines, that communicatively couples to one or more of measurement device 340, transmitter 442, receiver 444 (or, in some cases, a transceiver), one or more memory devices 448, display 160, and circuit 420. Processing circuitry 446 may control one or more operations of gauge 100. Processing circuitry 446 may be 8-bit, 16-bit, 32-bit, 64-bit or of any other suitable architecture. Processing circuitry 446 may include an arithmetic logic unit (ALU) for performing arithmetic and logic operations, processor registers that supply operands to the ALU and store the results of ALU operations, and a control unit that fetches instructions from one or more memory devices 448 and executes them by directing the coordinated operations of the ALU, registers and other components. Processing circuitry 446 may include other hardware and software that operates to control and process information. Processing circuitry 446 may execute software stored on one or more memory devices 448 to perform any of the functions described herein. Processing circuitry 446 controls one or more operations of gauge 100 by processing information received by or from measurement device 340, transmitter 442, receiver 444, and one or more memory devices 448. Processing circuitry 446 may be a programmable logic device, a microcontroller, a microprocessor, any suitable processing device, or any suitable combination of the preceding. Processing circuitry 446 is not limited to a single processing device and may encompass multiple processing devices, including circuit 420.

Processing circuitry 446 may be located within housing 130. Processing circuitry 446 may determine whether to perform a grip length measurement. For example, processing circuitry 446 may determine when terminals 150A and 150B have made contact with component 300. As another example, processing circuitry 446 may determine the position of pin 270. In certain embodiments, processing circuitry 446 may determine whether pin 270 is in a first, retracted position or a second, extended position. In certain embodiments, processing circuitry 446 may determine how to process measurements. For example, processing circuitry 446 may determine an adjustment applied to a measured value to calculate grip length (e.g. removing the depth of tip first end 112 from a measured value, or adjusting the measurement based on the type of head in the fastener intended to be used).

One or more memory devices 448 may store, either permanently or temporarily, data (e.g., determined measurements of grip length), operational software, or other information for processing circuitry 446 or circuit 420. One or more memory devices 448 may include any one or a combination of volatile or non-volatile local or remote devices suitable for storing information. For example, one or more memory devices 448 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 448, a disk, a compact disc (CD), or a flash drive. In particular embodiments, the software may include an application executable by processing circuitry 446 to perform one or more of the functions of gauge 100 described herein.

Memory 448 may store grip length measurements and data associated with grip length measurements. For example, memory 448 may store multiple grip length measurements and/or fasteners for use in various apertures as well as an index of aperture locations associated with the grip length measurements and/or fasteners. As another example, memory 448 may store whether, for a given grip length measurement, pin 270 was in a second, extended state or terminals 150A and 150B were in contact with component 300. Memory 448 may store data indicating which measurements have been communicated to receiving unit 450.

Memory 448 may also store data relating to the operation of gauge 100. In certain embodiments, memory 448 may store data relating to information presented on display 160. For example, memory 448 may store a setting in which display 160 presents a user with a grip length measurement value, an associated fastener dash number, and an indication of the period of time for which the grip length measurement value has remained within a tolerance. As another example, memory 448 may store a setting in which display 160 presents a grip length measurement value and an indication of whether the measured value has been communicated to receiving unit 450.

Receiving unit 450 includes antenna 415, transmitter 452, receiver 454, processing circuitry 456, and one or more memory devices 458. In certain embodiments the functions of transmitter 452 and receiver 454 may be combined into a transceiver. In certain embodiments, receiving unit 450 may not include transmitter 452.

Receiving unit 450 may include additional elements beyond those shown in FIG. 4. For example, in certain embodiments receiving unit 450 may include an input device (e.g., a keyboard, touchscreen, or other suitable input device) and a display device.

In certain embodiments, receiving unit 450 may store and process data relating to grip length measurements and/or the configuration of gauge 100. For example, receiving unit 450 may maintain an index of measured apertures; associate fasteners with apertures; store a database of grip length measurements, associated fastener dash numbers, and associated configuration data; and store various configurations for gauge 100 that can be transmitted to configure gauge 100 based on user input. In certain embodiments, a user may input data to receiving unit 450 manually to supplement data received from gauge 100.

Antenna 415 may be a component that sends or receives signals over a wireless interface. Antenna 415 may enable wireless transmission of grip length measurements and associated data to gauge 100. Antenna 415 may be located inside receiving unit 450 or mounted on the surface of receiving unit 450. Antenna 415 may be communicatively coupled to transmitter 452 and receiver 454 (or, in certain embodiments, to a transceiver).

Antenna 415 may enable wireless transmission of grip length measurements and associated data to gauge 100 (via antenna 410). Antenna 415 may enable transmission or reception of any information processed by measurement device 340, processing circuitry 446, or receiving unit 450, as well as any information stored in memory 458 or memory 448.

Transmitter 452, receiver 454, processing circuitry 456, and one or more memory devices 458 of receiving unit 450 may have analogous characteristics to processing circuitry 446, transmitter 442, receiver 444, and one or more memory devices 448 described above. For example, these components of receiving unit 450 may be implemented using any of the hardware/software described above with respect to gauge 100. These components of receiving unit 450 may store or process any of the data described above with respect to gauge 100.

In the example embodiment of FIG. 4, processing circuitry 456 communicatively couples to one or more of transmitter 452, receiver 454 (or, in some cases, a transceiver), and one or more memory devices 458.

Processing circuitry 456 may control one or more operations of receiving unit 450. Processing circuitry 456 may execute software stored on one or more memory devices 458 to perform any of the functions of receiving unit 450 described herein. Processing circuitry 456 controls one or more operations of receiving unit 450 by processing information received by or from transmitter 452, receiver 454, and one or more memory devices 458. Processing circuitry 456 may also control one or more operations of gauge 100 by communicating to gauge 100.

Transmitter 452 and receiver 454 (or, in certain embodiments, a transceiver) facilitate transmitting wireless signals to gauge 100 from receiving unit 450 and receiving wireless signals at receiving unit 450 from gauge 100, respectively. In certain embodiments, receiver 454 may receive a value indicating a measurement of grip length of a fastener (e.g., the actual measurement or any suitable indication thereof) from gauge 100. Receiver 454 may also receive data associated with grip length measurements or data relating to operation of gauge 100.

One or more memory devices 458 may store, either permanently or temporarily, data (e.g., received measurements of grip length), operational software, or other information for processing circuitry 456. Memory devices 458 may store, for example, grip length measurements, data associated with grip length measurements, or data relating to operation of gauge 100.

As an example embodiment of operation of the system of FIG. 4, an operator may insert gauge 100 into aperture 315 in component 300. The operator may trigger actuator 140 (e.g. by pressing a button) to extend pin 270 into a second, extended state, causing probes 280 to contact second surface 320 of component 300. Circuit 420 may detect when probes 280 have made contact with second surface 320. Once circuit 420 indicates to measurement device 340 that probes 280 have contacted second surface 320, measurement device 340 may measure a value indicating a grip length. Measurement device 340 may send the value to processing circuitry 446, which may determine a grip length based on the measured value, identify an associated fastener, and associate both these data with an index number representing the measured aperture. Processor 446 may store the determined grip length in memory 448, and the operator may view the determined grip length on display 160. Transmitter 442 may send the grip length, data indicating an associated fastener, and data indicating an associated aperture, to receiving unit 450. Processing circuitry 456 may use the received data to perform any suitable determination or calculation relating to aperture 315, component 300, or assembly of component 300 into a higher-level part. For example, processing circuitry 456 may use measured grip length values to determine whether component 300 has been manufactured within tolerance. Receiving unit 450 may store received data into memory 458.

FIG. 5 is a flow diagram of a method for measuring grip length according to certain embodiments. Method 500 begins in step 510 where an operator inserts one or more probes 280 of grip gauge 100 through aperture 315 in component 300. For example, an operator may insert grip gauge 100 into aperture 315 by aligning tip 110 with aperture 315 and pushing (or otherwise moving) gauge 100 toward third surface 330 such that tip first end 112 makes contact with first surface 310. In certain embodiments, an operator may continue to insert probes 280 through aperture 315 after tip first end 112 has made contact with first surface 310. In certain embodiments, inserting probes 280 of grip gauge 100 through aperture 315 in component 300 results in probes 280 clamping onto component 300. For example, clamping of probes 280 onto component 300 may prevent removal of grip gauge 100 from component 300. In certain embodiments, moving pin 270 into a second, extended state results in probes 280 clamping onto component 300. In certain embodiments, extension of pin 270 triggers a grip length measurement performed by measurement device 340. Probes 280 clamping onto component 300 may also trigger a grip length measurement performed by measurement device 340.

In step 520, gauge 100 determines a grip length for a fastener to be used in aperture 315 in component 300. In certain embodiments, gauge 100 determines a grip length based on a measurement performed using measurement device 340, as described above. For example, measurement device 340 may measure a value indicating a grip length using tip 110. In certain embodiments, the measurement may be performed in response to input from a user. In certain embodiments, gauge 100 may perform a measurement when a value indicating the grip length remains within a tolerance for a predetermined period of time. For example, circuitry within gauge 100, such as circuit 420, may determine that the indicated grip length has remained within +/−0.005 inches for 0.5 seconds, at which point a grip length measurement is performed.

In certain embodiments, gauge 100 may perform a measurement when one or more conditions relating to the configuration of gauge 100 are met. For example, gauge 100 may perform a measurement if pin 270 is in a second, extended state, if terminals 150A and 150B have made contact with component 300, or if probes 280 have made contact with component 300. Gauge 100 may require one or more conditions to be met before triggering a measurement.

Method 500 may include additional steps in some embodiments. For example, method 500 may include changing the configuration of gauge 100 upon completion of a measurement. For example, circuitry within gauge 100 may signal actuator 140 to retract pin 270 once measurement device 340 has completed a measurement.

Method 500 may include transmitting information to receiving unit 450 upon completion of a measurement. For example, gauge 100 may transmit a value indicating a grip length, an associated fastener, a location of the measured aperture, or any other suitable data once measurement device 340 has completed a measurement. In certain embodiments, transmitting information to receiving unit 450 may comprise wirelessly transmitting the information to the receiving unit.

Method 500 may also include storing data locally in memory 448 of gauge 100 upon completion of a measurement. For example, gauge 100 may store data relating to the configuration of gauge 100 (e.g., whether pin 270 was in a second, extended state or terminals 150A and 150B were in contact with component 300) during a measurement. Upon completion of a measurement, gauge 100 may transmit data to receiving unit 450, store data in memory 448, or both. In certain embodiments, a measured grip length and associated data may not be stored or transmitted (e.g., if a condition required for a valid measurement is not met).

Method 500 may also include indicating the measured grip length and an associated fastener on display 160 of gauge 100. Gauge 100 may indicate additional information on display 160, as discussed above with reference to FIG. 1 and FIG. 4.

Method 500 may also include indicating to a user with a visual, auditory, or other sensory alert that a measurement has been performed. For example, an LED on gauge 100 may light up green upon performance of a successful measurement and red upon performance of a failed measurement. A measurement may fail if a condition required to perform the measurement is not met. Conditions required to perform a measurement may relate to the configuration of gauge 100 or the value of grip length to be measured. For example, a failed measurement may result if pin 270 leaves a second, extended state, terminals 150A and 150B lose contact with component 300, or the measured grip length falls outside a tolerance during the time a measurement is being performed. As another example of a measurement alert, gauge 100 may vibrate briefly when a measurement is taken.

Method 500 may also include removing gauge 100 from the component 300. In certain embodiments, removal of gauge 100 from component 300 may require moving pin 270 into a first, retracted state. Pin 270 may be moved into a first, retracted state based on user input (e.g., an operator triggering actuator 140). In certain embodiments, pin 270 may be moved into a first, retracted state upon completion of a measurement, upon storage of measurement data in memory 448, or upon transmission of measurement data to receiving unit 450. For example, circuitry within gauge 100 may signal actuator 140 to move pin 270 into a first, retracted state once data associated with a completed measurement has been transmitted to receiving unit 450. In certain embodiments, removal of gauge 100 from component 300 may be performed manually by an operator.

Modifications, additions, or omissions may be made to the apparatuses, systems, and methods described herein without departing from the scope of the disclosure. The components of apparatuses, systems, and methods may be integrated or separated. Moreover, the operations of the apparatuses, systems, and methods may be performed by more, fewer, or other components. Additionally, operations of the apparatuses, systems, and methods may be performed using any suitable logic comprising software, hardware, and/or other logic. The methods may include more, fewer, or other steps. Additionally, steps may be performed in any suitable order.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus, comprising:
one or more probes configured for insertion through an aperture in a component;
a tip slidably engaged with the one or more probes, the tip comprising a first end configured to contact a first surface of the component, wherein the first end of the tip is conically shaped;
a pin slidably engaged with the one or more probes, the pin comprising a first end configured for insertion into the aperture in the component such that the one or more probes are configured to contact a second surface of the component, wherein an axis of the pin is substantially aligned with an axis of the tip and the pin is configured to move between a first position and a second position;
a sleeve at least partially surrounding the tip;
one or more terminals positioned on the sleeve and configured to contact a third surface of the component; and
a measurement device coupled to the tip and configured to measure a value indicating a grip length.

2. The apparatus of claim 1, wherein the measurement device is configured to measure the value indicating the grip length when the one or more terminals contact the third surface of the component.

3. The apparatus of claim 1, wherein the measurement device is configured to measure the value indicating the grip length when an indicator of the value remains within a tolerance for a predetermined period of time.

4. The apparatus of claim 1, wherein the measurement device is configured to measure the value indicating the grip length in response to input from a user.

5. The apparatus of claim 1, further comprising a circuit configured to determine when the pin is in the second position.

6. The apparatus of claim 1, wherein at least one of the one or more probes is configured to couple to a housing.

7. A system, comprising:
a gauge comprising:
one or more probes configured for insertion through an aperture in a component;
a tip slidably engaged with the one or more probes, the tip comprising a first end configured to contact a first surface of the component;
a pin slidably engaged with the one or more probes, the pin comprising a first end configured for insertion into the aperture in the component such that the one or more probes are configured to contact a second surface of the component, wherein an axis of the pin is substantially aligned with an axis of the tip;
a sleeve at least partially surrounding the tip;
one or more terminals positioned on the sleeve and configured to contact a third surface of the component; and
a measurement device coupled to the tip and configured to measure a value indicating a grip length; and
a receiving unit configured to receive data transmitted by the gauge.

8. The system of claim 7, wherein the first end of the tip is conically shaped.

9. The system of claim 7, wherein the gauge further comprises an actuator configured to move the pin between a first position and a second position.

10. The system of claim 7, wherein the gauge further comprises a display configured to show the value indicating the grip length.

11. The system of claim 7, wherein the gauge further comprises a transmitter coupled to the measurement device, the transmitter configured to transmit to the receiving unit data indicative of a fastener for use in the aperture in the component.

12. The system of claim 11, wherein the receiving unit is configured to store data associating the fastener with the aperture.

13. The system of claim 11, wherein the transmitter is configured to transmit the data indicative of the fastener in response to input from a user.

14. A method, comprising:
inserting one or more probes of a grip gauge through an aperture in a component, wherein the grip gauge comprises:
 a tip slidably engaged with the one or more probes, the tip comprising a first end configured to contact a first surface of the component; and
 a pin slidably engaged with the one or more probes, the pin configured for insertion in the aperture in the component such that the one or more probes are configured to contact a second surface of the component, wherein an axis of the pin is substantially aligned with an axis of the tip and the pin is configured to move between a first position and a second position;
 a sleeve at least partially surrounding the tip;
 one or more terminals positioned on the sleeve and configured to contact a third surface of the component; and
determining a grip length for a fastener to be used in the aperture in the component based on a measurement performed using the tip.

15. The method of claim 14, wherein the measurement is performed in response to input from a user.

16. The method of claim 14, further comprising:
performing the measurement when a value indicating the grip length remains within a tolerance for a predetermined period of time.

17. The method of claim 14, further comprising:
indicating the grip length and the fastener to be used on a display.

18. The method of claim 14, further comprising:
indicating to a user that a measurement device has performed the measurement with a visual or an auditory alert.

19. The method of claim 14, further comprising:
transmitting data indicative of the fastener to be used to a receiver.

* * * * *